United States Patent
Gupta et al.

(10) Patent No.: US 8,676,583 B2
(45) Date of Patent: Mar. 18, 2014

(54) BELIEF TRACKING AND ACTION SELECTION IN SPOKEN DIALOG SYSTEMS

(75) Inventors: Rakesh Gupta, Mountain View, CA (US); Deepak Ramachandran, Champaign, IL (US); Antoine Raux, Cupertino, CA (US); Neville Mehta, Mountain View, CA (US); Stefan Krawczyk, Mountain View, CA (US); Matthew Hoffman, Vancouver (CA)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 13/221,155

(22) Filed: Aug. 30, 2011

(65) Prior Publication Data
US 2012/0053945 A1    Mar. 1, 2012

Related U.S. Application Data

(60) Provisional application No. 61/378,303, filed on Aug. 30, 2010.

(51) Int. Cl.
*G10L 15/22*    (2006.01)

(52) U.S. Cl.
USPC .............................. 704/256; 704/9

(58) Field of Classification Search
USPC ........................................ 704/256
See application file for complete search history.

(56) References Cited

U.S. PATENT DOCUMENTS

| | | | |
|---|---|---|---|
| 6,081,782 A * | 6/2000 | Rabin | 704/275 |
| 6,311,159 B1 | 10/2001 | Van Tichelen et al. | |
| 6,675,159 B1 | 1/2004 | Lin et al. | |
| 6,742,021 B1 | 5/2004 | Halverson et al. | |
| 7,027,974 B1 * | 4/2006 | Busch et al. | 704/4 |
| 7,225,183 B2 | 5/2007 | Gardner | |
| 7,243,085 B2 | 7/2007 | Hatta | |
| 2002/0087314 A1 | 7/2002 | Fischer et al. | |
| 2002/0173960 A1 * | 11/2002 | Ross et al. | 704/257 |
| 2005/0043940 A1 | 2/2005 | Elder | |
| 2009/0030683 A1 * | 1/2009 | Williams | 704/236 |
| 2009/0030692 A1 | 1/2009 | Deligne et al. | |

(Continued)

OTHER PUBLICATIONS

"The Hidden Information State Approach to Dialog Management" Steve Young, Jost Schatzmann, Karl Weilhammer, Hui Ye, Engineering Department, Cambridge University, CB2 1 PZ, UK (IEEE ICASSP 2007.*

(Continued)

Primary Examiner — Jialong He
Assistant Examiner — Jie Shan
(74) Attorney, Agent, or Firm — Fenwick & West LLP; Mark E. Duell (57) ABSTRACT

An action is performed in a spoken dialog system in response to a user's spoken utterance. A policy which maps belief states of user intent to actions is retrieved or created. A belief state is determined based on the spoken utterance, and an action is selected based on the determined belief state and the policy. The action is performed, and in one embodiment, involves requesting clarification of the spoken utterance from the user. Creating a policy may involve simulating user inputs and spoken dialog system interactions, and modifying policy parameters iteratively until a policy threshold is satisfied. In one embodiment, a belief state is determined by converting the spoken utterance into text, assigning the text to one or more dialog slots associated with nodes in a probabilistic ontology tree (POT), and determining a joint probability based on probability distribution tables in the POT and on the dialog slot assignments.

18 Claims, 7 Drawing Sheets

(56) References Cited

U.S. PATENT DOCUMENTS

| | | | |
|---|---|---|---|
| 2009/0070103 A1* | 3/2009 | Beggelman et al. | 704/9 |
| 2009/0112598 A1* | 4/2009 | Williams | 704/270 |
| 2009/0192800 A1 | 7/2009 | Brandt | |
| 2010/0057762 A1* | 3/2010 | Hatami-Hanza | 707/101 |
| 2010/0138215 A1 | 6/2010 | Williams | |
| 2011/0282879 A1* | 11/2011 | Bargeron et al. | 707/740 |

OTHER PUBLICATIONS

Fernández et al (hereinafter Fernández), "Speech Interface for controlling an Hi-fi Audio System Based on a Bayesian Belief Networks Approach for Dialog Modeling" in Eurospeech, Lisboa (Portugal), 2005, pp. 3421-3424.*

Amari, S. "Natural Gradient Works Efficiently in Learning," *Neural Computation*, 1998, pp. 251-276, vol. 10, No. 2.

Araki, M. "OWL-based Frame Descriptions for Spoken Dialog Systems," *International Workshop on Semantic Web Foundations and Application Technologies*, 2003, three pages.

Bohus, D. et al., "A 'K Hypotheses + Other' Belief Updating Model," *AAAI Workshop on Statistical and Empirical Approaches to Spoken Dialogue Systems*, 2006, six pages.

Bohus, D. et al., "The RavenClaw Dialog Management Framework: Architecture and Systems," *Computer Speech and Language, Computer Speech and Language*, 2009, pp. 332-361, vol. 23.

Goyal, P. et al., "Application of Bayesian Framework in Natural Language Understanding," *IETE Technical Review*, 2008, pp. 251-269, vol. 25, Issue 5. [Online] [Retrieved Nov. 1, 2010] Retrieved from the Internet <URL:http://tr.ietejournals.org/printarticle.asp?issn=0256-4602;year=2008;volume=25;issue=5;spage=251;epage=269;aulast=Goyal;type=0.>.

Helsper, E. et al., "Building Bayesian Networks through Ontologies," *European Conference on Artificial Intelligence*, 2002, five pages.

Horvitz, E. et al., "Harnessing Models of Users' Goals to Mediate Clarification Dialog in Spoken Language Systems," *International Conference on User Modeling*, 2001.

Kim, K-M. et al., "A Semantic Bayesian Network Approach to Retrieving Information with Intelligent Conversational Agents," *Information Processing and Management*, 2007, pp. 225-236, vol. 43.

Koller, D. et al., "Object-Oriented Bayesian Networks," *Proceedings of the Thirteenth Annual Conference on Uncertainty in Artificial Intelligence*, Aug. 1-3, 1997, pp. 302-313, Providence, Rhode Island, USA.

Koller, D. et al., "P-Classic: A Tractable Probabilistic Description Logic," *Proceedings of the Fourteenth National Conference on Artificial Intelligence (AAAI-97)*, Aug. 1997, pp. 390-397, Providence, Rhode Island, USA.

Koller, D. et al., "Probabilistic Graphical Models: Principles and Techniques," 2009, pp. 345-375, 391-448, 562-576 and 1083-1124, MIT Press, Cambridge, Massachusetts, USA.

Melichar, M. "Design of Multimodal Dialogue-based Systems," Thesis, École Polytechnique Fédérale De Lausanne, 2008, 158 pages.

Noh, H. et al., "Ontology-based Inference for Information-Seeking in Natural Language Dialog Systems," *IEEE International Conference on Industrial Informatics*, 2008, pp. 1469-1474, Daejeon, Korea.

Paek, T. et al., Conversation as Action under Uncertainty, *Proceedings of the Sixteenth Annual Conference on Uncertainty in Artificial Intelligence*, 2000, pp. 455-464.

Papineni, K. et al., "Free-flow Dialogue Management Using Forms," $6^{th}$ *European Conference on Speech Communication and Technology: EUROSPEECH '99*, Sep. 5-9, 1999, pp. 1411-1414, Budapest, Hungary.

Park, H. et al., "Supporting Mixed Initiative Human-Robot Interaction: a Script-based Cognitive Architecture Approach," *2008 International Joint Conference on Neural Networks*, 2008, pp. 4107-4113.

Peters, J. et al., "Natural Actor-Critic," *Neurocomputing*, 2008, pp. 1180-1190, vol. 71.

Pfeffer, A. et al., "SPOOK: A System for Probabilistic Object-oriented Knowledge Representation," *Proceedings of the Fifteenth Annual Conference on Uncertainty in Artificial Intelligence (UAI)*, 1999, pp. 541-550, Stockholm, Sweden.

sourceforge.net, "Project PNL Summary," Intel, 2005, two pages. [Online] [Retrieved Dec. 13, 2011] Retrieved from the Internet <URL:http://web.archive.org/web/20050221080654/http://sourceforge.net/projects/openpnl.>.

Thomson, B. et al., "Bayesian Update of Dialogue State: A POMDP Framework for Spoken Dialogue Systems," *Computer Speech and Language*, 2009, thirty-five pages.

Van Zanten, G.E., "Adaptive Mixed-Initiative Dialogue Management," *IEEE Workshop on Interactive Voice Technology for Telecommunications Applications*, 1998, eight pages.

Williams, J., "Partially Observable Markov Decision Processes for Spoken Dialog Management," Apr. 2006, Dissertation for Degree in Doctor of Philosophy, Cambridge University Engineering Department, one hundred thirty-eight pages.

Williams, J., "Using Particle Filters to Track Dialogue State," *IEEE Workshop on Automatic Speech Recognition and Understanding*, 2007, six pages.

Young, S. et al., "The Hidden Information State Model: A Practical Framework for POMDP-based Spoken Dialog Management," *Computer Speech and Language*, 2009, pp. 150-174, vol. 24.

PCT International Search Report and Written Opinion, PCT Application No. PCT/US2011/049758, Jan. 18, 2012, nine pages.

* cited by examiner

BELIEF TRACKING AND ACTION SELECTION IN SPOKEN DIALOG SYSTEMS

RELATED APPLICATIONS

This application claims the benefit of U.S. Provisional Application No. 61/378,303, filed Aug. 30, 2010 the content of which is incorporated by reference herein in its entirety.

FIELD OF THE INVENTION

The exemplary embodiments relate to the field of human-machine dialog systems and more particularly to the implementation of a belief tracking dialog system with a parameterized policy for action selection.

BACKGROUND OF THE INVENTION

A central function of human-machine dialog systems is the tracking and estimation of a user's intentions based on spoken utterances (commonly referred to as "belief tracking"). Belief tracking systems may gather information over several turns of interaction between the systems and a user. The user's dialog may be converted into text using automatic speech recognition (ASR), and the converted text may be processed by a natural language understanding system which extracts the meaning of the text and passes it to a belief tracking system. Given the potential for error in speech recognition and understanding due to noisy observations and other forms of interference, probabilistic approaches to belief tracking are desirable. These probabilistic approaches may utilize Bayesian networks that represent the system's belief as the joint probability space of concepts while leveraging conditional independence among them. These approaches also typically constrain the domain, for example to air travel, in order to improve performance.

The design of a domain-specific Bayesian network requires significant effort and expert knowledge that is not always readily available. Further, real-world systems often yield large networks on which inference is intractable without major assumptions and approximations. Mitigating the computation requirements of determining the joint distribution of user intentions is typically performed by assuming full conditional independence between concepts. However, such an assumption violates existing dependencies between concepts and results in inaccurate joint distributions.

Belief tracking systems are often implemented within or in conjunction with spoken dialog systems capable of performing various actions based on a user's determined intentions. For example, a belief tracking system implemented in a mobile phone may receive the spoken command "call Bill", and may automatically dial a contact's phone number in advance. Likewise, if the mobile phone belief tracking system does not understand what the user wants, the system may prompt the user to repeat the command. Such systems utilize an action selection policy (hereinafter, "policy") which maps, in one embodiment, a set of actions to be performed to a distribution of belief states of user intentions. Alternatively, a policy may map a set of actions to be performed to other conversation attributes, such as the emotional state of the speaker, the vocabulary of the speaker, the semantic content of the conversation, or any other attribute related to the conversation or to the speaker.

Multi-turn spoken dialog systems may utilize partially observable Markov decision processes (POMDPs) to track user intentions over a series of turns and to decide which actions to take based on the tracked user intentions. POMDPs maintain and rely on a probability distribution over a set of possible belief states based on previous observations, and update the probability distribution based on each subsequent observations. At each turn, a POMDP performs an action based on the belief state probability distribution according to an action selection policy. In an goal-oriented environment, such as a dialog system in which a user is seeking a particular action to be performed, a POMDP attempts to optimize the minimum number of turns required to perform the action by rewarding correct actions taken and penalizing incorrect actions taken.

An action selection policy may include parameters that dictate the action performed according to a belief state distribution. For example, such a policy may include belief state thresholds, and a dialog system may perform a first action if a particular threshold is met by the belief state and a second action if the threshold is not met by the belief state. The policy parameters may be manually discretized, but doing so is time consuming, prone to errors and often ignores the local structure among high dimensional domain concepts.

SUMMARY OF THE INVENTION

The selection and performance of an action in response to receiving a spoken utterance in a spoken dialog system is described. A policy which includes a mapping of belief states of user intent to actions to be performed is retrieved or created. In one embodiment, the policy may map belief state features to actions. The belief state of user intent is determined based on the spoken utterance. An action is selected based on the determined belief state and the policy. If the selected action requires additional feedback from the user, the additional feedback is requested and the process is repeated. If the action does not require additional feedback from the user, the action is performed.

Creating a policy may include iteratively determining which actions to perform in response to particular belief states using a POMDP. Initial policy parameters are determined by manual selection, based on previously created policies, by random selection, or based on any other suitable criteria. A simulated user input associated with a pre-determined goal is created and the belief state of the simulated user input is determined. In one embodiment, the simulated user input is intentionally obscured by noise in order to best simulate the environment in which an actual user utterance is received and where other audio noise may be present. An action is performed based on the determined belief state and based on the policy parameters. If the goal is not achieved by the performance of the action, the simulated user input is modified, the belief state is re-determined, and an action is re-performed. If the goal is achieved by the performance of the action, a POMDP reward score is determined for the iterative user input and action performance process. If a policy threshold is not satisfied, the policy parameters are modified and this process is continued until the policy threshold is satisfied.

Determining a belief state of user intent may include the use of a probabilistic ontology tree ("POT"). In one embodiment, a POT is created based on an ontology, either pre-existing or modified for the purpose of creating a POT. A probability distribution table is determined for each ontology node, and a Bayesian network is created based on the ontology and the determined probability tables. The built or retrieved POT includes a plurality of unobserved nodes, each node including an associated probability distribution table. The spoken utterance is converted into text using, for example, automatic speech recognition, and the converted text is assigned to one or more dialog slots associated with POT nodes. Observed nodes are created in POT based on the assigned slots, and probability distribution tables are created for the observed nodes based on the slot assignment confidence and the domain of the observed nodes. A belief state is determined based on the joint probability of the probability distribution tables of the POT's unobserved nodes and observed nodes.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Spoken Dialog System Overview

Figure 1:
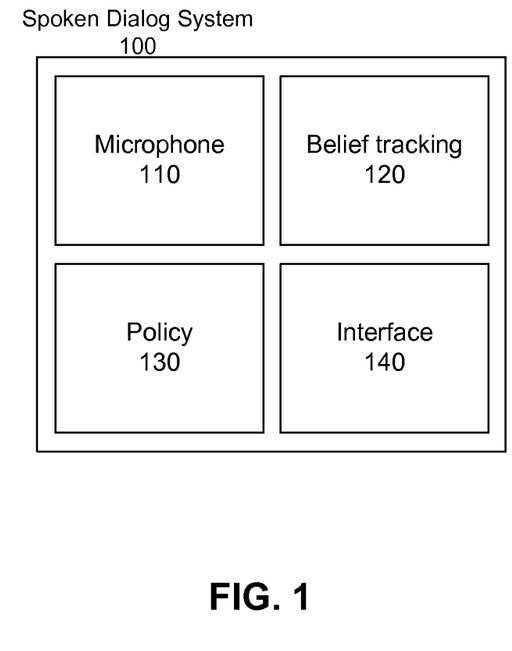
FIG. 1 illustrates an environment for implementing belief tracking and policy parameterization in a spoken dialog system in accordance with one embodiment.

FIG. 1 illustrates an environment for implementing belief tracking and policy parameterization in a spoken dialog system ("SDS") in accordance with one embodiment. The SDS 100 may be implemented as a standalone system, may be communicatively coupled to another system, or may be implemented as a component within a larger system. In one embodiment, the SDS 100 may be implemented in a vehicle. In this embodiment, a user may interact with the SDS 100 to access information about the vehicle; access information about stores, restaurants, services, or other entities; receive driving directions or other navigation instructions; make phone calls; retrieve and play media; or take any other function related to a vehicle system. Alternatively, the SDS 100 may be implemented within a mobile phone, a computer, a website, or any other system which utilizes belief tracking and policy parameterization.

The SDS 100 includes a microphone 110, a belief tracking module 120, a policy module 130, and an interface module 140. In alternative embodiments, additional or fewer components may be present, or the functionality of two or more components may be combined (for instance, the belief tracking module 120 and the policy module 130 may be implemented in a single module). The microphone 110 is configured to receive spoken utterances from a user. Spoken utterances include commands, requests, queries, clarifications, system navigation requests, or any sound from a user in a form. The microphone 110 records spoken utterances for processing and analysis by the SDS 100.

The belief tracking module 120 determines the intent of a user with regards to the SDS 100 based on observations of the spoken utterances of the user. To determine the intent of a user, the belief tracking module 120 maintains and updates a probability distribution over a set of concepts in one or more domains using one or more POTs. As will be discussed below, when a user speaks an utterance, the belief tracking module 120 converts the utterance to text and then extracts observations from the text with a certain degree of confidence. The belief tracking module 120 then computes a joint probability distribution of the most likely user intent hypotheses to determine the belief state of the user intent.

The policy module 130 stores a policy which maps a set of actions which the SDS 100 can perform or can request another system to perform to a set of user intent belief states. In one embodiment, the policy module 130 uses the belief tracking module 120 to determine the intent of a user, and requests an action to be performed from an interface module 140 in response to the determined intent of the user and based on the stored policy. The policy module 130 may optionally include training functionality to create and/or modify a policy. As will be discussed below, the policy module 130 may utilize a POMDP decision maker to adjust policy parameters automatically in training in order to optimize the policy implemented by the policy module 130.

The interface module 140 includes the functionality to interface with the SDS 100 or an external system in order to perform an action requested by the policy module 130. In one embodiment, the interface module 140 performs actions related to the SDS 100. For example, the interface module 140 may request clarification from a user, may confirm a user utterance, or may inform a user of information requested by a user. Alternatively, the interface module 140 may turn on or turn off the SDS 100, may restart a user interaction, or may cancel an interaction. The interface module 140 may retrieve information requested by a user from, for example, the internet, a database, or local storage. The interface module 140 may interface with a vehicle to perform vehicle functions, may interface with a phone to perform phone functions, may interface with a navigation system to perform navigation functions, or may interface with any other system communicatively coupled to the SDS 100.

In an example use case, the SDS 100 receives a query from a user via the microphone 110. The belief tracking module 120 converts the utterance to text, and, as will be discussed below, assigns the text to one or more dialog slots. Based on the text assigned to slots, the confidence of the conversion from the utterance to text, and the confidence of the slot assignment, the belief tracking module 120 determines a joint probability distribution for the user intent belief state. Based on this joint probability distribution, the policy module 130 determines an action to perform, and the interface module 140 performs this action.

Figure 2:
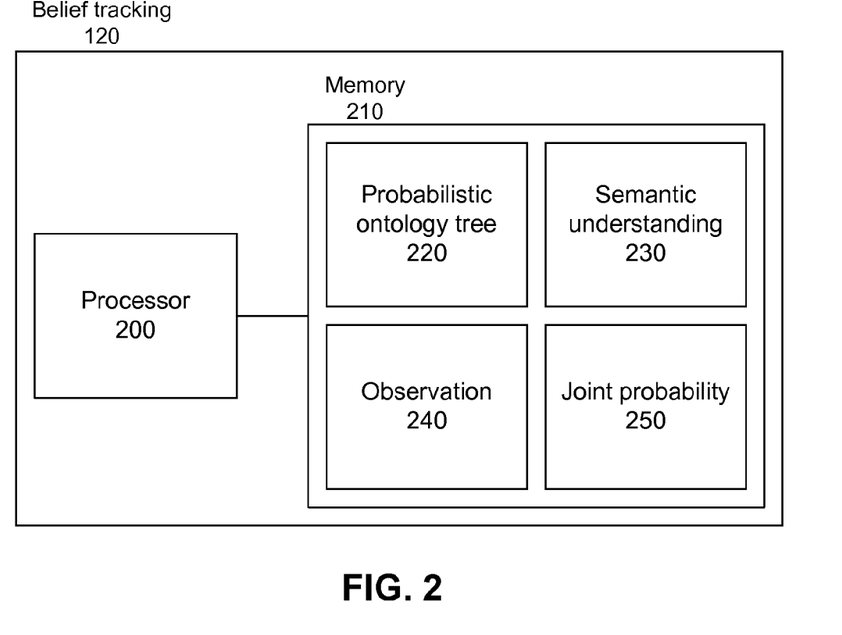
FIG. 2 illustrates a belief tracking module for using probabilistic ontology trees to determine a joint probability distribution across user intent belief states based on user dialog observations in accordance with one embodiment.
Figure 3:
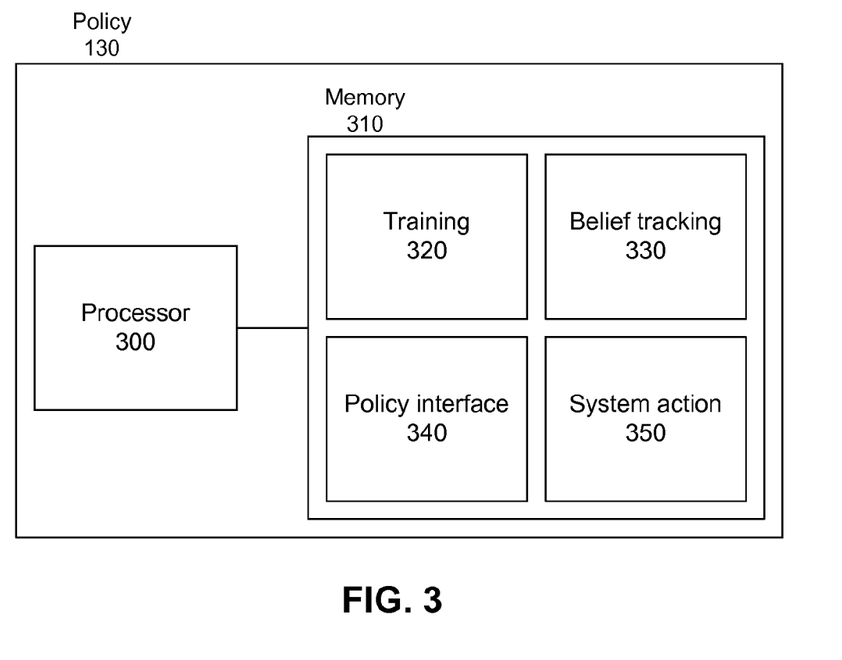
FIG. 3 illustrates the policy module for determining an action to perform based on a determination of a user's intent in accordance with one embodiment.

FIG. 2 illustrates the belief tracking module 120 for using POTs to determine a joint probability distribution across user intent belief states based on user dialog observations in accordance with one embodiment. The belief tracking module 120 as illustrated includes a computer processor 200 and a memory 210. Note that in other embodiments, the belief tracking module 120 may include additional features other than those illustrated in FIG. 2. FIG. 3 illustrates the policy module 130 for determining an action to perform based on a determination of a user's intent in accordance with one embodiment. The policy module 130 as illustrated includes a computer processor 300 and a memory 310. Note that in other embodiments, the policy module 130 may include additional features other than those illustrated in FIG. 3.

In one embodiment, the belief tracking module 120 and the policy module 130 are implemented with separate processors and memories. Alternatively, the belief tracking module 120 and the policy module 130 may be implemented with the same processor and memory. For example, the modules of the memory 210 and the modules of the memory 310 may be implemented in a single memory. In one embodiment, the belief tracking module 120 is implemented in the belief tracking module 330. For the sake of simplicity, the belief tracking module 120 and the policy module 130 are discussed separately for the remainder of this description.

The processor 200 and the processor 300 process data signals and may include various computing architectures including a complex instruction set computer (CISC) architecture, a reduced instruction set computer (RISC) architecture, or an architecture implementing a combination of instruction sets. Although only a single processor is shown in each of FIG. 2 and FIG. 3, multiple processors may be included. The processors 200 and 300 may include arithmetic logic units, microprocessors, general purpose computers, or some other information appliances equipped to transmit, receive and process electronic data signals from and between each other and the memories 210 and 310, the microphone 110, and the interface 140.

The memories 210 and 310 stores instructions and/or data that may be executed by processors 200 and 300, respectively. The instructions and/or data may comprise code (i.e., modules) for performing any and/or all of the techniques described herein. The memories 210 and 310 may be any non-transitory computer-readable storage medium such as dynamic random access memory (DRAM) device, a static random access memory (SRAM) device, Flash RAM (non-volatile storage), combinations of the above, or some other memory device known in the art.

In the embodiment of FIG. 2, the memory 210 includes a POT module 220, a semantic understanding module 230, an observation module 240, and a joint probability module 250. In the embodiment of FIG. 3, the memory 310 includes a training module 320, a belief tracking module 330, a policy interface 340, and a system action module 350. Note that in other embodiments, the memories may include additional or fewer modules to perform the functionalities described herein. The modules stored within the memory 210 are adapted to communicate with each other and the processor 200. The modules stored within the memory 310 are adapted to communicate with each other and the processor 300. The modules of memories 210 and 310 are also adapted to communicate with the microphone 110, the interface module 140, the SDS 100 and any external systems communicatively coupled to the SDS 100.

Belief Tracking

Figure 4:
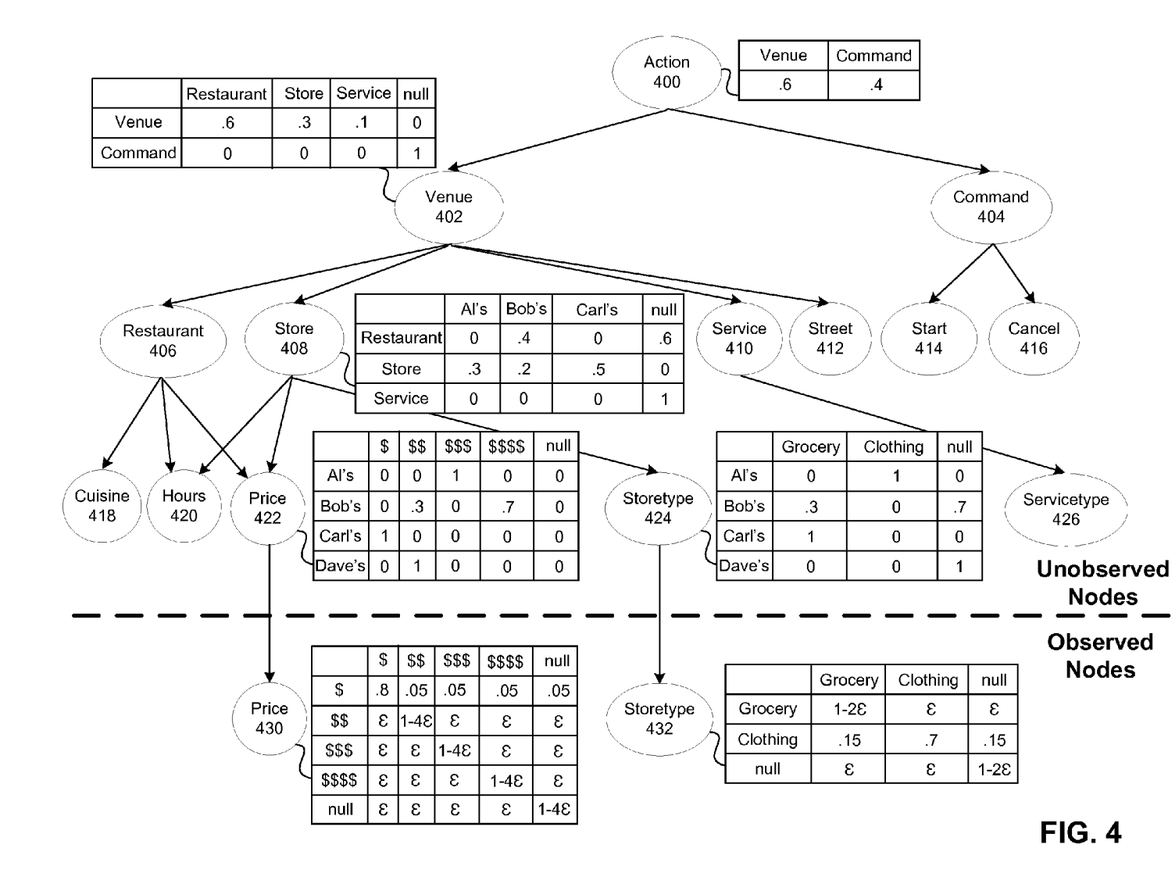
FIG. 4 illustrates an example probabilistic ontology tree in accordance with one embodiment.

The belief tracking module 120 determines a joint probability distribution of a belief state of user intent. The joint probability distribution determined by the belief tracking module 120 is based on a user utterance and a POT stored by the POT module 220. A POT is a tree-structure Bayesian network that extends a domain ontology by specifying probability distributions for Bayesian network node values. The POT module 220 may store any number of POTs. FIG. 4 illustrates an example POT in accordance with one embodiment. For example, the POT of FIG. 4 may be implemented in a vehicle navigation system. Each POT node represents a particular concept or sub-concept within a domain. The POT of FIG. 4 includes an action node 400, a venue node 402, a command node 404, and so forth. The action node 400 represents the possible actions a user may take, namely finding a venue (associated with the venue node 402) and issuing an SDS command (associated with the command module 404). It should be noted that although probability tables are only illustrated for some nodes, each node has an associated probability table. Further, it should be emphasized that a typical POT may have several hundred or more nodes.

There are two types of POT nodes: specialization nodes (which represent IS-A relationships) and composition nodes (which represent HAS-A relationships). If two nodes have an IS-A relationship, the first of the nodes represents a concept which is a subset of the concept represented by the second of the nodes. For example, the venue node 402 represents the possible venues a user may search, namely a restaurant (associated with the restaurant node 406), a store (associated with the store node 408), and a service (associated with the service node 410). In this example, the restaurant node 406, the store node 408, and the service node 410, which represent subsets of the concept "venue", are specialization nodes. If two nodes have a HAS-A relationship, a first of the nodes represents a concept which is a property of the concept represented by the second of the nodes. For example, the venue node 402 also represents properties of the possible venues, such as the street a venue is located on (associated with the street node 412). In this example, the street node 412 is a composition node, and is a child node of the venue node 402.

In one embodiment, specialization nodes have exactly one parent, and the set of subconcepts associated with a set of specialization nodes with a common parent node represent are disjoint. In the embodiment of FIG. 4, the action node 400, the venue node 402, the command node 404, the restaurant node 406, the store node 408, the service node 410, the start node 414, and the cancel node 416 are specialization nodes. In one embodiment, a composition node may have one or more parent nodes, but may only have more than one parent node if all of the parent nodes are specialization nodes and in turn have a common parent node. In the embodiment of FIG. 4, the street node 412, the cuisine node 418, the hours node 420, the price node 422, the storetype node 424, and the servicetype node 426 are composition nodes.

POTs include nodes representing concepts independent of a user utterance ("unobserved nodes") and nodes representing concepts observed in a user utterance ("observed nodes"). Unobserved nodes exist for each domain concept and subconcept represented by the POT. Observed nodes exist for domain concepts and subconcepts which the belief tracking module 120 has determined are associated with a user's utterances. In operation, the belief tracking module 120 retrieves a POT from the POT module 220, and adds observed nodes to the retrieved POT based on a user's utterances. Observed nodes are discussed below with regards to the observation module 240.

Each POT node has an associated probability distribution. The POT root node has a probability distribution representing the probability that the concept represented by the unobserved node takes a possible value. In the example of FIG. 4, the action node 400 has an associated probability distribution indicating a 60% chance that the action node 400 takes the value "venue" and a 40% chance that the action node takes the value "command". In one embodiment, each POT has exactly one root node.

Non-root unobserved nodes have a probability distribution representing the probability that the concept represented by the unobserved node takes a possible value given the value of the unobserved node's parent node. Further, the probability distributions of non-root unobserved nodes include a null element for the cases where the unobserved node concept is inapplicable given the value of the parent node. In the example of FIG. 4, if the venue node 402 takes the value "restaurant", the store node 408 has a 40% chance of taking the value "Bob's" and a 60% chance of taking the value "null". Likewise, if the venue node 402 takes the value "store", the store node 408 has a 30% chance of taking the value "Al's", a 20% chance of taking the value "Bob's", and a 50% chance of taking the value "Carl's". Finally, if the value of the venue node 402 is "service", the store node 408 has a 100% chance of taking the value "null". These probability distributions indicate that, for example, there are three possible stores (Al's, Bob's, and Carl's), that Bob's is both a restaurant and a store, and that neither Al's, Bob's, nor Carl's provide a service relevant to the service node 410.

Observed nodes have an associated probability distribution representing the likelihood that a user spoke an utterance associated with an intended node and an intended node value, and that the SDS 100 correctly and incorrectly identifies the intended node value. In addition, the probability distribution associated with observed nodes represent the likelihood that a user spoke an utterance associated with an unintended node and an intended node value, and that the SDS correctly and incorrectly identifies the intended node value. The probability distribution associated with observed nodes are discussed below in greater detail with regards to the observation node 240.

The POTs stored by the POT module 220 may be created in advance by the SDS 100. POTs are built based on one or more ontologies. In one embodiment, a POT is built based on an established ontology. Alternatively, an ontology may be created, modified or customized for the purposes of creating a POT. Once an ontology is selected, a Bayesian network is created based on the ontology and with the same graphical structure as the ontology. A probability distribution table is then created for each node of the Bayesian network.

The entries of the probability distribution tables may be based on expert knowledge, learned data, or any other suitable means. Null semantics are applied to the probability distributions in order to ensure that inconsistent instantiations of the ontology have a probability of 0 in the POT. As discussed above, the entries of the probability distribution table for specialization nodes may be conditional upon the value of the specialization node's parent node. Likewise, the entries of the probability distribution table for composition nodes may be conditional upon the value of one or more of the composition node's parent nodes. In one embodiment, if the value of the parent node is null, the probability that the value of the child node is null is 1. If the value of a composition node is required to exist for a non-null value of the composition node's parent node, then the composition node is an essential node. In one embodiment, if the parent node of an essential node has a non-null value, the probability that the essential node has a value of null is 0.

A POT is retrieved from the POT module 220 in response to receiving a spoken utterance via the microphone 110. Each node of the POT is associated with a dialog slot. The semantic understanding module 230 uses ASR to convert the spoken utterance into text. A word confidence score may be assigned to each word converted from utterance into text based on the confidence that ASR converted the utterance into text correctly. The semantic understand module 230 then assigns the text to dialog slots based on the word confidence scores and grammar rules. A slot confidence score may be assigned to the assigned dialog slots based on the degree of certainty in the observation. The same word or words text may be assigned to multiple dialog slots, and each text-to-dialog slot assignment is assigned a slot confidence score.

The semantic understanding module 230 generates one or more hypotheses based on the dialog slots to which text is assigned. In one embodiment, a hypothesis is generated for each unique combination of assignments of text to dialog slots such that each text word is assigned to no more than one dialog slot at a time. A hypothesis confidence score is assigned to each hypothesis and may be based on how many dialog slots are matched, the word and slot confidence scores, the dependencies and relatedness between the assigned slots, or any other suitable factor.

In one embodiment, the semantic understanding module 230 selects the hypothesis with the highest hypothesis confidence score. The semantic understanding module 230 then identifies the nodes associated with the dialog slots of the determined hypothesis. The observation module 240 creates observed nodes in the POT retrieved from the POT module 220 based on the identified nodes, and creates probability distribution tables for each of the observed nodes. Each observed node is created as a child node of the associated unobserved node in the POT. In the example of FIG. 4, a hypothesis contains dialog slot assignments associated with the price node 422 and the storetype node 424. As a result, the price node 430 is created as a child node to the price node 422 and a storetype node 432 is created as a child node to the storetype node 424, where both the price node 430 and the storetype node 432 are observed nodes. The probability distribution table entries for observed nodes may be based on the confidence score of the selected hypothesis, based on the potential values of POT nodes, and based on the value of a POT node intended by a user in the spoken utterance.

In one embodiment, the probability distribution table entries are computed for an observed node using the following equations:

$$Pr(\hat{X} = x \mid X = x) = \frac{1 + \frac{c(|D(X)| - 1)}{100}}{|D(X)|} \quad (1)$$

$$Pr(\hat{X} \neq x \mid X = x) = \frac{1 - \frac{c}{100}}{|D(X)|} \quad (2)$$

$$Pr(\hat{X} = x \mid X \neq x) = 1 - \varepsilon(|D(X)| - 1) \quad (3)$$

$$Pr(\hat{X} \neq x \mid X \neq x) = \varepsilon \quad (4)$$

In equations 1-4, X is a random variable representing the user-intended values of the observed node, $\hat{X}$ is a random variable representing the observed semantic understanding of the observed node, x is the observed value for the observation node, c represents the slot confidence score for the dialog slot associated with the observation node with values in the interval $[0, 100]$, and $\varepsilon$ represents a non-zero error margin, such as $\varepsilon = 10^{-10}$.

In one embodiment, a user may be given the option to confirm or reject a hypothesis. In this embodiment, the observation module 240 may not create observation nodes until the user confirms the hypothesis, or may create observation nodes but may not add the observation nodes to the POT until the user confirms the hypothesis. Likewise, the observation module 240 may discard the hypothesis, or may remove the observation nodes associated with the hypothesis from the POT if the user rejects the hypothesis.

Once a hypothesis is selected and observation nodes are added to the retrieved POT, the joint probability module 250 computes a joint probability distribution for combinations of POT node values using the probability distribution tables associated with each POT node, conditioned on the observed variables. The combination of POT node values that results in the most likely joint probability is output by the joint probability module 250 as the most probable explanation of user intent. The joint probability module 250 may compute the joint probability for every combination of POT node values, but this requires extremely large amounts of storage space, processing power, and time. These requirements are directly affected by the number of nodes in the retrieved POT and the number of possible values per node.

To reduce the requirements of exhaustively determining the joint probability distribution for all combinations of node values, the joint probability module 250 utilizes a message-passing algorithm to determine the most probable explanation of user intent. The message-passing algorithm determines node-level joint probabilities in reverse topological order, starting at the leaf nodes of the POT. Once the joint probability distribution is determined for a particular node, the top m joint probabilities are passed in message form to the node's parent node. It should be noted that the design of the POT ensures that the m-best joint probabilities are consistent across specializations, and that one and only one specialization node value is applicable per node in any joint probability.

The message-passing algorithm requires a node to receive a message from all children nodes of the node before the node can in turn send a message to the node's parent node. The message-passing algorithm defines the messages passed from leaf nodes to parent nodes as the identity vector. For a non-leaf node, the message passed to a parent node is a vector that represents the multiplication of the top m joint probabilities received from a child node message weighted by the child node's probability distribution table values for all child nodes, for each combination of descendant nodes (child nodes, grandchild nodes, and so on) represented by the top m joint probabilities received from child node messages. Once these joint probabilities are computed, the non-leaf node passes the top m joint probabilities to the node's parent node.

In one embodiment, the message-passing algorithm is expressed as:

--- if X is a leaf node, then
 $\psi_X(x) \leftarrow 1, \forall x \in D(X)$
 return $\psi_X$
end if
for $x \in D(X)$ do
 for $\vec{z} = ((y_1, z_1^*), \ldots, (y_k, z_k^*)) \in \{D(\psi_{Y_1}) \times \ldots \times D(\psi_{Y_k})\}$ do $\psi_X'(x, \vec{z}) \leftarrow \prod_i [\Pr(Y_i = y_i | X = x) \times \psi_{Y_i}(y_i, z_i^*)]$ end for
 $\psi_X(x) \leftarrow$ top m elements of $\psi_X'(x)$
end for
return $\psi_X$

---

In this algorithm, X is a random variable which represents a node for which a message is computed, $\psi_x$ represents the message passed by the node, $\vec{z}$ represents the values of descendant nodes associated with the top m joint probabilities received by the node, y represents the children nodes of the node, and $\psi_y$ represents messages received from the children nodes. By limiting the probability distributions passed in message form to a parent node to the top m joint probabilities, less likely joint probabilities are discarded early, reducing the computational complexity required to maintain all permutations of node values.

The message-passing algorithm is iterated for successively higher levels of the POT hierarchy until the top m joint probabilities are determined for the POT's root node. The root node's highest joint probability is associated with a set of node values that represents the most probable user intent. The joint probability module 250 outputs this set of node values as the most probable user intent hypothesis. In the example of FIG. 4, if the highest joint probability at the action node 400 is associated with the values {store, Al's, $$$, . . . }, then the hypothesis output by the joint probability module 250 representing the belief state of the user's intent in dialog slot form would be (venue=store, store=Al's, price=$$$) and so forth. In one embodiment, the joint probability module 250 outputs more than one hypothesis, and the user selects which (if any) hypothesis is correct.

Policy Parameterization

The policy module 130 determines an action to perform based on a determined belief state and a stored policy, and performs the action. The policy module 130 also may contain the functionality to train a policy for later use. As discussed above, a policy is a function which maps a set of actions to a set of belief states of user intentions. For example, a policy may map an uncertain or unconfident belief state of a user's intentions to a "request more information" action. In one embodiment, the set of actions which a policy maps to belief states is limited to requesting clarification from a user, confirming one or more dialog slots, or informing a user. In an alternative embodiment, the set of actions may include additional actions, as discussed above.

The training module 320 creates a policy based on simulated user interactions for which the user intended user action, or the goal, is known ahead of time. A simulated user interaction includes a series of user-machine turns, wherein each turn includes receiving a simulated user utterance, determining the belief state of the user's intent based on the utterance, and performing an action based on the belief state. The simulated user utterances may be intentionally obscured by noise in order to best simulate receiving actual user utterances through a microphone in an environment where other audio noise may be present. The training module 320 utilizes a POMDP decision-maker to update policy parameters by maintaining a reward score for each simulated user interaction. As discussed above, in a goal-oriented environment, a POMDP attempts to minimize the number of turns required to perform a user-intended action through the use of a reward/penalty system. Each time an action other than the intended action is performed, a penalty may be applied to the reward score. For instance, the reward score may be reduced by 1. In order to minimize the number of turns required to perform a user-intended action, the reward scores are optimized by iteratively modifying policy parameters, re-simulating the user interactions, and selecting the policy parameters which result in the highest reward scores.

The training module 320 first retrieves an initial policy. The initial policy includes initial policy parameters which may be manually selected by a system operator, may be selected based on previous trained policies, may be randomly selected, or may be selected based on any other criteria. The policy may be stochastically represented by the probability distribution $\pi_\theta(a_t/b_t)$, parameterized by the vector $\theta$, wherein $a_t$ represents an action to be taken given the belief state $b_t$. The discounted long-term expected reward score may be represented by the equation:

$$J(\theta) = E\left[\sum_{t=0}^{\infty} \gamma^t r(g, a_t)\right] \quad (5)$$

In equation 5, E represents the expectation operator, $\gamma$ represents a discount-factor in the interval $(0, 1)$ which reduces future rewards based on the number of turns until the reward, r represents the reward score to be awarded, and g represents the goal or intended action.

The expectation function of equation 5 integrates over all possible goals and all sequences of actions and observations. To determine the optimal policy parameters, the training module 320 attempts to find the parameters which optimize the value of the reward score expectation function $J(\theta)$. It should be noted that because the optimization policy used herein requires a stochastic policy, the policy ire is probabilistic. Further, because the policy is stochastic, the policy helps the optimization process avoid becoming locked in to suboptimal local maxima.

In order to optimize the policy parameters, the gradient $\nabla J(\theta)$ of the reward score expectation function is determined. In one embodiment, the natural gradient $\tilde{\nabla} J(\theta)$ is determined in place of the gradient $\nabla J(\theta)$. The natural gradient of the reward score expectation function may be determined using the equation:

$$\tilde{\nabla} J(\theta) = G_\theta^{-1} \nabla J(\theta) \quad (6)$$

In equation 6, $G_\theta$ represents the Fisher-information matrix, which takes into account the curvature of the parameter space. The natural gradient $\tilde{\nabla} J(\theta)$ represents the steepest direction of ascent with respect to a corresponding Riemannian metric. In the POMDP setting, the gradient can be computed using the episodic Natural Actor-Critic (eNAC) algorithm. The eNAC algorithm approximates the gradient using sample trajectories from the POMDP model. More information about the natural gradient can be found in S. Amari's "Natural gradient works efficiently in learning" in Neural Computation, Vol. 10, No. 2, pages 251-276, which is incorporated by reference herein. More information on the eNAC algorithm can be found in J. Peters' and S. Schaal's "Natural actor-critic" in Neurocomputing, Vol. 71, Iss. 7-9, pages 1180-1190, which is incorporated by reference herein.

In one embodiment, the eNAC algorithm computes the gradient by solving for $\omega$ in the equation:

$$\sum_{t=0}^{T} \gamma^t \nabla \log \pi_\theta(a_t | b_t)^{Tr}\omega + V_\theta(b_0) = \sum_{t=0}^{T} \gamma^t r_t \quad (7)$$

In equation 7, $V_\theta(b_0)$ is the value of the belief-state $b_0$, which has an expected value of $J(\theta)$, T represents the number of sampled trajectories sampled over successive turns during training, and Tr represents the transposition operator. Equation 7 is essentially a regression problem, and can be solved for $\omega$ as long as the number of sampled trajectories is greater than the number of parameters in $\theta$. Once equation 7 is solved for $\omega$, the training module 320 uses $\omega$ as an approximation of the natural gradient, i.e. $\omega \approx \tilde{\nabla} J(\theta)$.

The gradient points in the direction of the steepest slope on the parameter space. Once the gradient is determined, the training module 320 takes a step in this direction by adjusting the policy parameters as indicated by the gradient and may iteratively repeat this process until a convergence metric is satisfied. In one embodiment, the convergence metric is satisfied when a particular reward score is consistently achieved during simulation. In an alternative embodiment, the convergence metric is satisfied when the change of parameters consistently fails to exceed a pre-determined threshold. Alternatively, instead of satisfying a convergence metric, the training module 320 may simulate user interactions for a threshold number of iterations. After the training module 320 satisfies a convergence metric or an iteration threshold, the policy parameters are stored as an action-belief policy.

The training module 320 adjusts the policy parameters as indicated by the computed gradient so that a particular action is selected based on a particular belief state. It should be noted that the belief state is represented by a vector in a high-dimensional continuous space. Accordingly, determining the belief state values to map to a particular action in such a space may require a large amount of computing power, time and simulation iterations. To reduce these requirements, the training module 320 may instead map belief state features to actions. Belief state features are represented by $\phi$, and may include all the information provided by the user in past turns. In other embodiments, parameterization can also be extended to other features, such as concepts provided in the last turn by the user, features that express confidence such as ratio of likelihood of the top two beliefs, or any other suitable feature.

The training module 320 may map belief features to a probability distribution over actions, where $\pi_\theta(a|\phi)$ represents the probability of taking action a given the belief features $\phi$. It should be noted that belief features $\phi$ map the belief state to $R^N$, where R represents the real number domain, and where N represents the number of features. In one embodiment, a general policy is created to select between D possible actions. A Gibbs policy may be constructed to select from these actions, and may be represented by the equation:

$$\pi_\theta(a|\varphi) = \frac{e^{\varphi[M_\theta]_a}}{\sum_{a'} e^{\varphi[M_\theta]_{a'}}} \quad (8)$$

In equation 8, $M_\theta$ represents a matrix such that $M_\theta \in R^{D \times N}$, and $[M_\theta]_a$ represents the ath row of the matrix $M_\theta$.

In one embodiment, for any parameterization of $M_\theta$, the log-policy gradient can be written as:

$$\nabla \log \pi_\theta(a|\varphi) = \nabla([M_\theta]_a \varphi) - \sum_{a'} \pi_\theta(a'|\varphi) \nabla([M_\theta]_{a'} \varphi) \quad (9)$$

The structure of $M_\theta$ may take into account the local structure of dialog slots. In one embodiment, we assume a dialog system with n slots, a set of n local actions which each only act on a single slot (e.g. a request action), a single global action which acts on all slots (e.g. an inform action), and a particular slot-based structure for the belief features defined by the equation:

$$\phi = [\phi_0; \ldots; \phi_{n-1}] \in R^{nm} \quad (10)$$

In equation 10, m represents the number of values/slot (the number of local features for each slot). Note that each slot contributes local features $\phi_i \in R^m$, that each $\phi$ vector is m-dimensional, and that each $\phi$ vector entry is associated with a particular slot or a global action.

Continuing with this embodiment, it should be noted that parameters may be exhaustively learned, but this would require learning on the order of $n^2m$ parameters. Alternatively, the slot-based structure of the belief features can be leveraged to reduce the number of parameters which must be learned. In this embodiment, each set of local features $\phi_i$ independently votes for an action for the slot associated with the set of local features. In addition, in this embodiment, all sets of local features vote for the global action. This system of voting may be represented by the equation:

$$M_\theta = \begin{bmatrix} \hat{\theta}_0^{Tr} & & \\ & \ddots & \\ & & \hat{\theta}_{n-1}^{Tr} \\ \hline \overline{\theta}_0^{Tr} & \cdots & \overline{\theta}_{n-1}^{Tr} \end{bmatrix} \in R^{(n+1)\times nm} \quad (11)$$

In equation 11, $\hat{\theta}_i$ and $\overline{\theta}_i$, correspond to the contributions the ith slot makes to local and global actions, respectively. Note that each sub-vector must be the same size as each set of local features, resulting in a total of 2 nm parameters.

In this embodiment, for a parameter vector constructed by stacking the components from equation 11, namely $[\hat{\theta}_0; \ldots; \hat{\theta}_{n-1}; \overline{\theta}_0; \ldots; \overline{\theta}_{n-1}]$, the gradient from equation 9 can be rewritten as:

$$\nabla([M_\theta]_a \phi) = [0_{am}; \phi_a; 0_{(2n-a-1)m}] \text{ for } a<n \quad (12)$$

and $$\nabla([M_\theta]_a \phi) = [0_{nm}; \phi] \text{ for } a=n \quad (13)$$

In one embodiment, parameter values may be shared. For example, the same local parameters may be shared across all slots, e.g. $\hat{\theta}_i = \hat{\theta}$. Assuming $M_{L\theta}$ represents the matrix M with shared local parameters, the gradient from equation 9 can be rewritten as:

$$\nabla([M_{L\theta}]_a \phi) = [\phi_a; 0_{nm}] \text{ for } a<n \quad (14)$$

$$\nabla([M_{L\theta}]_a \phi) = [0_m; \phi] \text{ for } a=n \quad (15)$$

Likewise, global parameters may be shared across slots, e.g. $\overline{\theta}_i = \overline{\theta}$. Assuming $M_{G\theta}$ represents the matrix M with shared global parameters, the gradient from equation 9 can be rewritten as:

$$\nabla([M_{G\theta}]_a \phi) = [0_{am}; \phi_a; 0_{m(n-a)}] \text{ for } a<n \quad (16)$$

$$\nabla([M_{G\theta}]_a \phi) = [0_{nm}; \phi_0 + \ldots + \phi_{n-1}] \text{ for } a=n \quad (17)$$

In one embodiment, both local parameters and global parameters are shared. Assuming $M_{A\theta}$ represents the matrix M with shared local and global parameters, the gradient from equation 9 can be rewritten as:

$$\nabla([M_{A\theta}]_a \phi) = [\phi_m; 0_m] \text{ for } a<n \quad (18)$$

$$\nabla([M_{A\theta}]_a \phi) = [0_m; \phi_0 + \ldots + \phi_{n-1}] \text{ for } a=n \quad (19)$$

Once the training module 320 develops policy parameters, the policy may be stored in the policy module 130, for instance in the training module 320 or the policy interface 340. The policy module 130 receives a spoken utterance through the microphone 110, and the belief tracking module 330 determines a belief state of user intent based on the spoken utterance. As discussed above, the belief tracking module 330 may implement the functionality of the belief tracking module 120, or may interface with the belief tracking module 120. Alternatively, the belief tracking module 330 may determine a belief state of user intent by any other suitable means. In one embodiment, the belief tracking module 330 determines a set of belief features $\phi$ based on the belief state of user intent.

The policy interface 340 retrieves a policy mapping a belief state or belief features to an action and retrieves a belief state or belief features from the belief tracking module 330. The policy interface module 340 applies the retrieved policy to the user's spoken utterance by voting for each potential action in a set of actions based on the retrieved policy parameters and the belief state or belief features of the user utterance. The distribution of votes over the set of actions may be represented by a probability distribution for the set of actions.

In one embodiment, the policy interface 340 utilizes the policy parameter matrix $M_\theta$ and set of belief features $\phi$ described above, and votes for each action a in a set of potential actions with weights given by the ath row of $M_\theta$, e.g. $[M_\theta]_a \phi$. In this embodiment, a probability distribution may be computed for the set of actions by taking a normalized exponential of these votes.

In one embodiment, the policy interface 340 outputs the votes for the set of actions to the system action module 350. Alternatively, the policy interface 340 may output a probability distribution for the set of actions to the system action module 350. The system action module 350 selects an action to perform based on the output receive from the policy interface 340. In one embodiment, the system action module 350 selects the most voted for action or the most probable action to perform.

The system action module 350 may perform an action using the interface module 140. In the embodiment where the complete set of actions the system action module 350 can perform consists of requesting clarification from a user, confirming a user utterance, or informing a user of information requested by a user, the system action module 350 may use the speech capabilities of the interface module 140 to perform the selected action. For example, if the selected action includes requesting clarification of one or more dialog slots from a user, the interface module 140 may use audio signals to prompt the user to clarify the one or more dialog slots, or may use image signals on a display to prompt the user to clarify the one or more slots. Likewise, if the selected action includes informing the user of information requested by the user, the interface module 140 may use audio signals to inform the user of the information requested by the user, or may use image signals on a display to present the requested information to the user. If clarification or confirmation are requested from the user, the SDS 100 may receive an additional spoken utterance from the user, and the policy module 130 may determine a new action to take based on the additional spoken utterance. This cycle may iteratively repeat until the policy module 130 selects an inform action.

The system action module 350 may select an action outside of the context of requesting clarification, confirming a request, or informing a user. In one embodiment, the SDS is implemented in a vehicle, and the system action module 350 may retrieve information from a local source (such as a vehicle's computer or other vehicle systems) or an external source (such as over the internet using a wireless communication technology like WiFi, 3G, 4G, LTE, WiMax or any other wireless protocol). In one embodiment, the system action module 350 uses a user's or a vehicle's phone system to make a call as requested by the user. The system action module 350 may also be capable of implementing vehicle functions, such as turning on/off headlights and/or windshield wipers, turning on/off or adjusting the radio or media system, selecting a piece of media content to play, turning on/off or interfacing with a navigation system, or any other vehicle function.

Spoken Dialog System Operation

Figure 5:
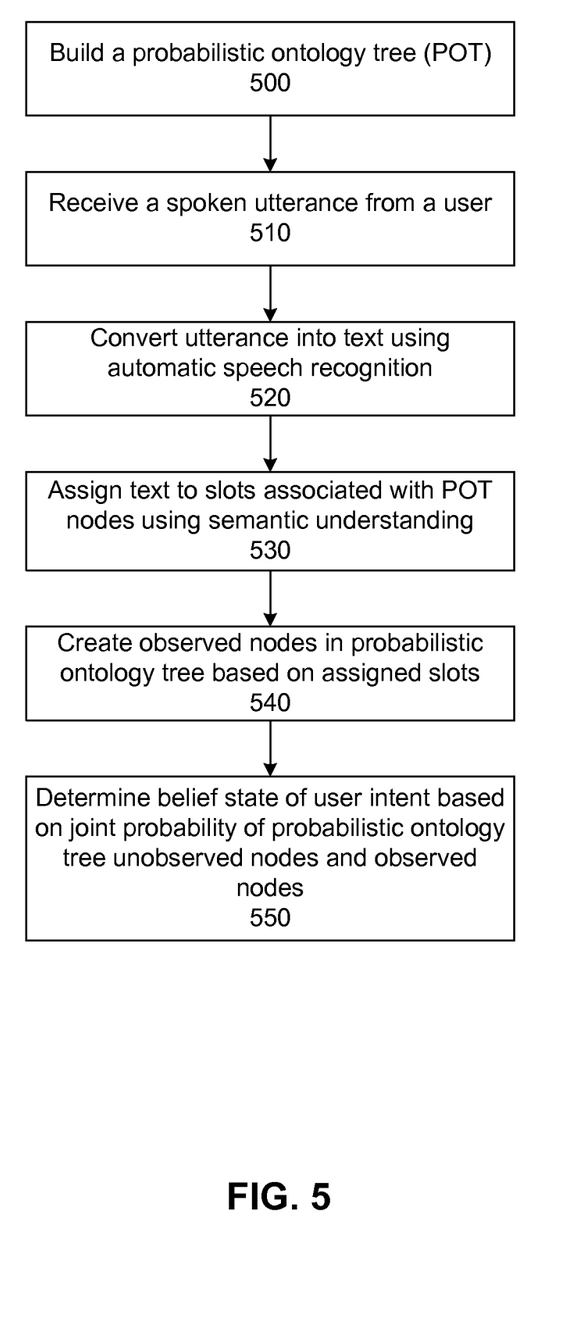
FIG. 5 is a flowchart illustrating the determination of user intent through belief tracking in accordance with one embodiment.

FIG. 5 is a flowchart illustrating the determination of user intent through belief tracking in accordance with one embodiment. The process of determining user intent through belief tracking may optionally include building 500 one or more POTs. Alternatively, a pre-existing POT may be retrieved. The built or retrieved POT includes a plurality of unobserved nodes, each node including an associated probability distribution table. A spoken utterance is received 510 from a user. The spoken utterance is converted 520 into text using automatic speech recognition or any other technique capable of converting spoken language into text.

The converted text is assigned 530 to one or more dialog slots associated with POT nodes using semantic understanding. Semantic understanding may account for the confidence that a spoken utterance was converted into text correctly and the confidence that the text is related to the one or more dialog slots. In one embodiment, the converted text is assigned to multiple combinations of dialog slots, and the combination of dialog slots with the highest assignment confidence is selected. Observed nodes are created 540 in the POT based on the assigned slots. Probability distribution tables are created for the observed nodes based on the slot assignment confidence and the domain of the observed nodes. A belief state is determined 550 based on the joint probability of the probability distribution tables of the POT's unobserved and observed nodes.

Figure 6:
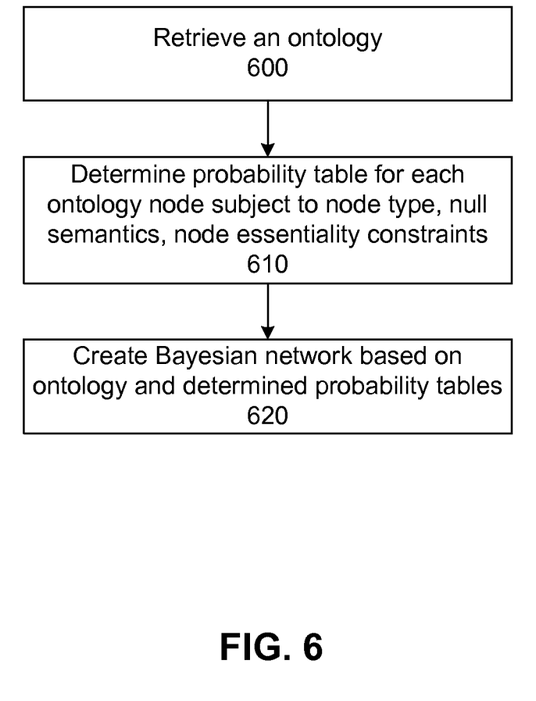
FIG. 6 is a flowchart illustrating the creation of a probabilistic ontology tree in accordance with one embodiment.

FIG. 6 is a flowchart illustrating the creation of a probabilistic ontology tree in accordance with one embodiment. An ontology is retrieved 600. In one embodiment, an ontology may be created, or a retrieved ontology may be modified prior to the creation of a POT. A probability distribution table is determined 610 for each ontology node subject to node type constraints, null semantic constraints, and node essentiality constraints. A Bayesian network is created 620 based on the ontology and the determined probability tables.

Figure 7:
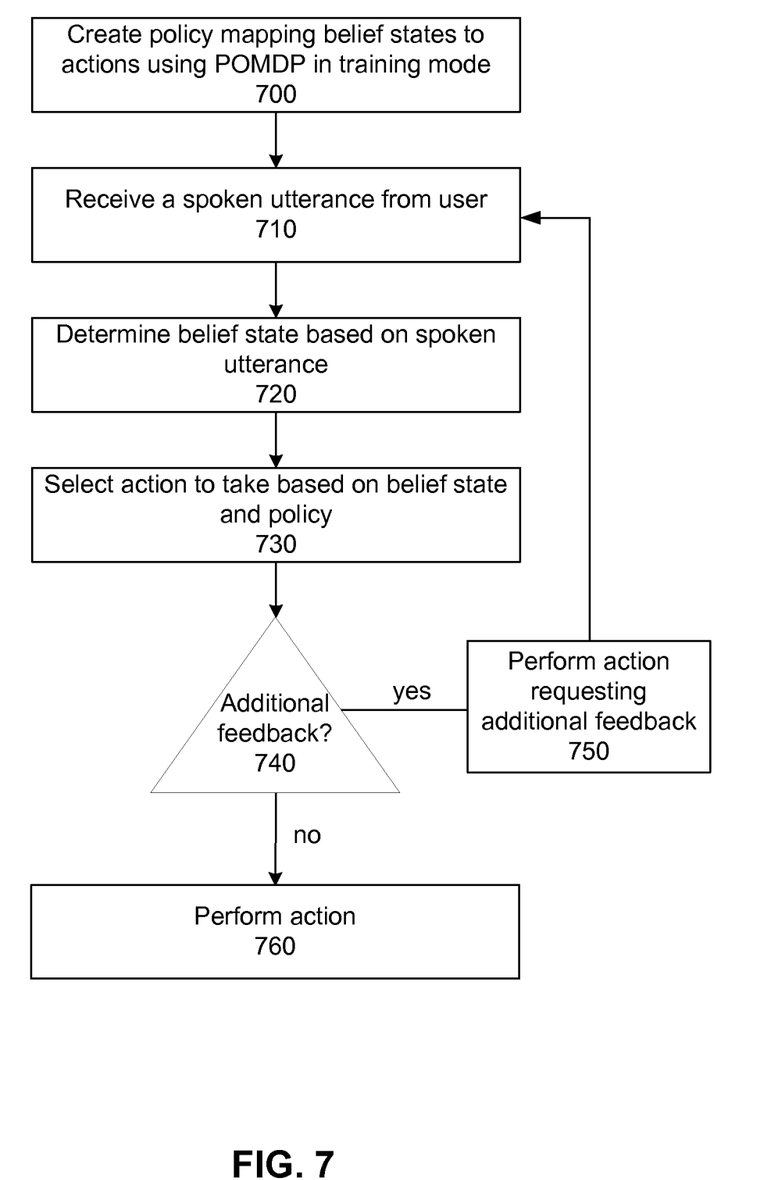
FIG. 7 is a flowchart illustrating the performance of an action by a spoken dialog system in response to a vocal query in accordance to one embodiment.

FIG. 7 is a flowchart illustrating the performance of an action by a spoken dialog system in response to a vocal query in accordance to one embodiment. A policy is optionally created 700 which maps belief states to actions using a POMDP. In one embodiment, a policy created in advance is retrieved. The policy may map belief state features to actions in one embodiment. A spoken utterance is received 710 from a user. A belief state is determined 720 based on the spoken utterance. In one embodiment, belief state features are determined in place of or in addition to the belief state. An action is selected 730 based on the determined belief state and the retrieved policy. If the selected action requires 740 additional feedback from the user, additional feedback is requested 750 and the process is repeated. If the action does not require additional feedback from the user, the action is performed 760.

Figure 8:
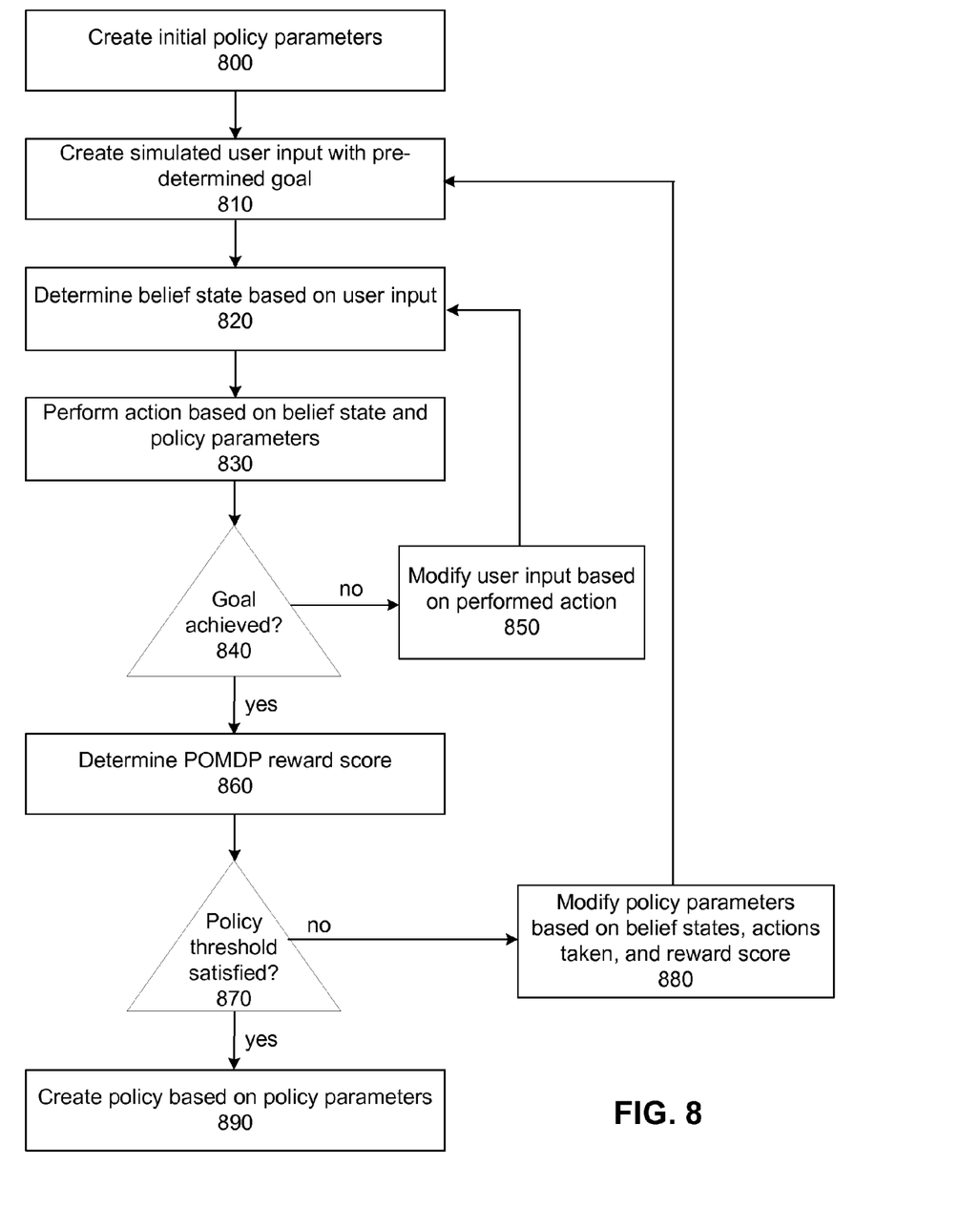
FIG. 8 is a flowchart illustrating the creation of a policy in accordance to one embodiment.

FIG. 8 is a flowchart illustrating the creation of a policy in accordance to one embodiment. Initial policy parameters are created 800. In one embodiment, the initial policy parameters are manually selected, selected based on previously created policies, or randomly selected. A simulated user input is created 810, the simulated user input associated with a pre-determined goal. The belief state is determined 820 based on the simulated user input. In one embodiment, the simulated user input is intentionally obscured by noise in order to best simulate the environment in which an actual user utterance is received and where other audio noise may be present.

An action is performed 830 based on the determined belief state and based on the policy parameters. If the goal is not achieved 840 by the performance of the action, the simulated user input is modified 850, the belief state is re-determined 820, and an action is re-performed 830. If the goal is achieved 840 by the performance of the action, a POMDP reward score is determined 860 for the iterative user input modification and action performance process.

If after determining the POMDP reward score, it is determined that a policy threshold is not satisfied 870, the policy parameters are modified 880 based on the determined belief states, the performed actions, the number of actions performed, and the determined reward score. Examples of policy thresholds include a pre-determined number of actions being performed, a convergence onto a pre-determined reward score threshold by determined POMDP scores, and a policy parameter modification convergence. If after determining the POMDP reward score, it is determined that a policy threshold is satisfied 870, a policy is created 890 based on the final policy parameters. The policy may be stored for later use by a spoken dialog system.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions could be embodied in software, firmware or hardware, and when embodied in software, could be downloaded to reside on and be operated from different platforms used by a variety of operating systems. The embodiment can also be in a computer program product which can be executed on a computing system.

The exemplary embodiments also relate to an apparatus for performing the operations herein. This apparatus may be specially constructed for the purposes, e.g., a specific computer in a vehicle, or it may comprise a general-purpose computer selectively activated or reconfigured by a computer program stored in the computer which can be in a vehicle. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the exemplary embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope of the embodiments.

While particular embodiments and applications have been illustrated and described herein, it is to be understood that the embodiment is not limited to the precise construction and components disclosed herein and that various modifications, changes, and variations may be made in the arrangement, operation, and details of the methods and apparatuses without departing from the spirit and scope.

What is claimed is:

1. A computer-based method of performing an action in a spoken dialog system comprising:
    retrieving a policy mapping belief states of user intents to actions;
    receiving a spoken utterance from a user;
    determining a belief state of the user's intent based on the spoken utterance using a probabilistic ontology tree (POT) comprising a plurality of unobserved nodes each representing a domain concept and comprising a probability distribution table including probabilities that the concept represented by the unobserved node takes each of a plurality of values, wherein each unobserved node is associated with a dialog slot to which the spoken utterance is assigned based on the relatedness between the spoken utterance and the domain concept represented by the unobserved node;
    selecting an action to take based on the determined belief state and the retrieved policy; and
    performing the selected action.

2. The method of claim 1, wherein the selected action comprises an action requiring additional feedback from the user.

3. The method of claim 2, wherein the selected action comprises a request for clarification of all or part of the spoken utterance from the user.

4. The method of claim 2, wherein the selected action comprises a request for confirmation of all or part of the spoken utterance from the user.

5. The method of claim 1, wherein the selected action comprises informing the user of information requested by the user.

6. The method of claim 1, wherein retrieving a policy comprises creating a policy.

7. The method of claim 6, wherein creating a policy comprises:
    creating policy parameters;
    creating a simulated user input with a pre-determined goal;
    determining a simulated belief state of user intent based on the created simulated user input;
    performing an action based on the simulated belief state and the policy parameters; and
    outputting the policy parameters if the performed action satisfies the pre-determined goal.

8. The method of claim 7, further comprising:
    modifying the simulated user input based on the performed action if the performed action does not satisfy the pre-determined goal;
    determining a second simulated belief state of user intent based on the modified simulated user input;
    performing a second action based on the second simulated belief state and the policy parameters; and
    outputting the policy parameters if the performed second action satisfies the pre-determined goal.

9. The method of claim 8, further comprising:
    determining a partially observable Markov decision process (POMDP) reward score based on the performed actions; and
    responsive to a determination that a policy threshold is satisfied based on the POMDP reward score, outputting the policy parameters.

10. The method of claim 9, further comprising:
    responsive to a determination that a policy threshold is not satisfied based on the POMDP reward score, modifying the policy parameters based on one or more of: the simulated belief state, the second simulated belief state, the performed action, the second performed action, and the POMDP reward score;
    creating a second simulated user input with a pre-determined goal;
    determining a third simulated belief state of user intent based on the second simulated user input; and
    performing a third action based on the third simulated belief state and the modified policy parameters.

11. The method of claim 1, wherein the determined belief state comprises belief features of the user's intent.

12. The method of claim 1, wherein determining a belief state of the user's intent based on the spoken utterance comprises:
    creating an observed node in the POT for each dialog slot associated with an unobserved node to which the spoken utterance is assigned, each observed node comprising a probability distribution table including probabilities that the intended node value of the unobserved node is correctly and incorrectly identified; and determining a belief state of user intent based on the joint probability of the unobserved node probability distribution tables and the observed node probability distribution tables.

13. The method of claim 12, wherein the spoken utterance is converted into text using automatic speech recognition, and wherein the spoken utterance is assigned to one or more dialog slots by determining a confidence score for each assignment based on the likelihood that the text was correctly assigned to a dialog slot.

14. The method of claim 13, wherein the probability distribution tables of the observed nodes are determined based on the confidence score and the domain concept associated with the observed nodes.

15. The method of claim 12, wherein the joint probability of the unobserved node probability distribution tables and the observed node probability distribution tables is determined using a message-passing algorithm in which child node passes a message to the child node's parent node, and wherein each message comprises the joint probability distributions of the child node and all descendant nodes of the child node.

16. A spoken dialog system for performing an action comprising:
a policy module for retrieving a policy mapping belief states of user intents to actions;
a microphone for receiving a spoken utterance from a user;
a belief tracking module for determining a belief state of the user's intent based on the spoken utterance using a probabilistic ontology tree (POT) comprising a plurality of unobserved nodes each representing a domain concept and comprising a probability distribution table including probabilities that the concept represented by the unobserved node takes each of a plurality of values, wherein each unobserved node is associated with a dialog slot to which the spoken utterance is assigned based on the relatedness between the spoken utterance and the domain concept represented by the unobserved node;
a policy interface for selecting an action to take based on the determined belief state and the retrieved policy; and
a system interface for performing the selected action.

17. A non-transitory computer-readable storage medium having computer-executable code for performing an action comprising:
a policy module configured to retrieve a policy mapping belief states of user intents to actions;
a microphone module configured to receive a spoken utterance from a user;
a belief tracking module configured to determine a belief state of the user's intent based on the spoken utterance using a probabilistic ontology tree (POT) comprising a plurality of unobserved nodes each representing a domain concept and comprising a probability distribution table including probabilities that the concept represented by the unobserved node takes each of a plurality of values, wherein each unobserved node is associated with a dialog slot to which the spoken utterance is assigned based on the relatedness between the spoken utterance and the domain concept represented by the unobserved node;
a policy interface module configured to select an action to take based on the determined belief state and the retrieved policy; and
a system interface module configured to perform the selected action.

18. A computer-based method for determining a belief state of a user's intent comprising:
receiving a spoken utterance from the user;
converting the spoken utterance into text;
retrieving a probabilistic ontology tree (POT), the POT comprising a plurality of unobserved nodes, each unobserved node representing a domain concept and comprising a probability distribution table including probabilities that the concept represented by the unobserved node takes each of a plurality of values, wherein each unobserved node is associated with a dialog slot;
assigning the text to one or more dialog slots associated with unobserved nodes based on the relatedness between the text and the domain concepts represented by the unobserved nodes;
creating an observed node in the POT for each dialog slot to which text is assigned, the observed nodes comprising a probability distribution table including probabilities that the intended node value of the unobserved node is correctly and incorrectly identified; and
determining a belief state of user intent based on the joint probability of the unobserved node probability distribution tables and the observed node probability distribution tables.

* * * * *